(12) United States Patent
Hurst et al.

(10) Patent No.: US 6,179,317 B1
(45) Date of Patent: Jan. 30, 2001

(54) VEHICLE TRAILER SAFETY ASSEMBLY

(75) Inventors: William Hurst, New Holland; David Justiniano, Douglassville, both of PA (US)

(73) Assignee: Morgan Corporation, Morgantown, PA (US)

( * ) Notice: Under 35 U.S.C. 154(b), the term of this patent shall be extended for 0 days.

(21) Appl. No.: 09/447,665

(22) Filed: Nov. 23, 1999

(51) Int. Cl.[7] ........................................ B60D 1/28
(52) U.S. Cl. ............................................ 280/457
(58) Field of Search ................................ 280/457, 458, 280/456.1, 480

(56) References Cited

U.S. PATENT DOCUMENTS

| | | | | |
|---|---|---|---|---|
| 3,739,432 | * | 6/1973 | Sander et al. | 24/590 |
| 4,180,281 | * | 12/1979 | Tertinek | 280/457 |
| 4,558,880 | * | 12/1985 | Nangle et al. | 280/457 |
| 5,700,024 | * | 12/1997 | Upchurch | 280/507 |
| 5,893,575 | * | 4/1999 | Larkin | 280/491.1 |
| 5,918,896 | * | 7/1999 | Jenkins, Jr. | 280/457 |
| 6,024,373 | * | 2/2000 | Wallace | 280/457 |

OTHER PUBLICATIONS

Trailers, "Trailer Couplings, Hitches, and Safety Chains—Automotive Type—SAE J684," SAE Standard, 35:35.01–35.03 (Mar. 1994).

* cited by examiner

Primary Examiner—Kevin Hurley
(74) Attorney, Agent, or Firm—Carella Byrne et al; Elliot M. Olstein; William Squire

(57) ABSTRACT

A trailer safety chain has a connection link member in the form of either a double S-hook or a single S-hook, the double S-hook cooperating with a unique matching slot for providing enhanced safety securing of the hook to a towing vehicle. A securing bracket for the chain is attached to a vehicle rear and includes two like unique openings which straddle a central tow hitch tongue and coupler ball for receiving two like trailer safety chain hooks. Each opening, which is T-shaped has intersecting slots, which accommodate either of the two hooks of different dimensions, and does so, without diminishing the enhanced locking security of the double S-hook.

11 Claims, 4 Drawing Sheets

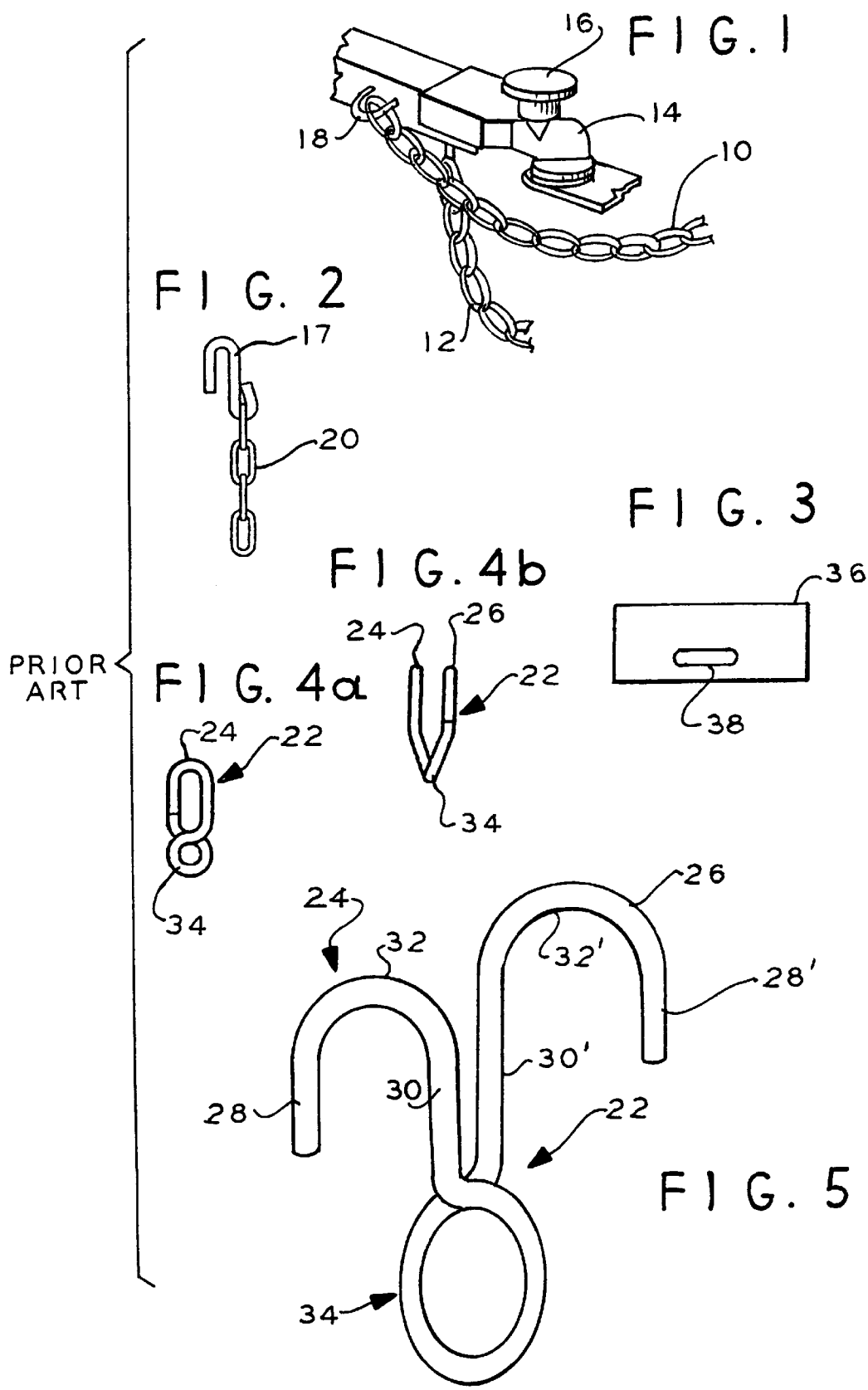

VEHICLE TRAILER SAFETY ASSEMBLY

This invention relates to safety tethers, e.g., chains, for coupling trailers to a vehicle as a safety measure in conjunction with a trailer hitch assembly.

There is an automotive standard that applies to trailer hitches and safety chains employed with the hitches. SAE standard 35 specifies the various parameters for such hitches. Included in the standard are requirements for the safety chains for use with such hitches. The safety chains are tethers, usually chain links formed of bent steel rods, that are connected to the trailer and to the vehicle as a safety factor should the primary hitch fail. In this case, the safety chain keeps the trailer attached to the vehicle to minimize property damage and injury to others in case of such hitch failure.

The chains are permanently attached to the trailer and have a hook at the free end for releasable attachment to a mating element on the vehicle for receiving the hook. The problem with such chain hooks, is that in operation, the vehicle and trailer are subject to frequent vibrations and displacements induced by rough roads, bumps and so on. It is important that the hook not disengage during such operation.

The SAE standard states a safety chain is any connection including chains or equivalents from the trailer tongue to the rear of the towing vehicle for the purpose of retaining connection between the towing and towed vehicle in the event of separation of the trailer coupling or ball. A hitch is part of the towing vehicle whereas the safety chain is part of the towed trailer. Steel cable may be used in place of chains. The safety chain shall be connected to the trailer and towing vehicle so that the slack for each length of chain between trailer and towing vehicle is the same when the vehicles are aligned on a common front to rear centerline.

Two lengths of chain 10, 12, FIG. 1, are used They are connected to opposite sides of the trailer tongue 14 to the towing vehicle. The chains are crossed under the trailer tongue so they cradle the trailer coupling and tongue in the event of separation of the coupling 16. As seen in FIG. 1, the end link of the chains is interlocked with a hasp 17 permanently attached to the trailer tongue and is not removable therefrom.

The other end of the chains are attached to the vehicle rear by a hook arrangement. In FIG. 2, an S shaped hook 17 is attached to chain 20 to be attached to a hasp at the vehicle rear (not shown). In some applications, the single S-hook 17 and the safety chain links are passed through a relatively large opening (not shown) and the S-hook engages the chain directly. The opening may be provided by a steel rod that is bent to form a hasp loop and attached to the vehicle rear. In the alternative, the opening may merely comprise a large aperture in a plate (not shown). The rod forms a loop (or the aperture) sufficiently large to receive the chain and the S-hook passed therethrough.

The hook 17 is formed from steel rod generally about ⅝ inches in diameter. The free end of the hook 17 is slipped into an eyelet or other looped device (not shown) discussed above attached to the vehicle rear. This arrangement is not always satisfactory because the hook 17 may jump out of the mating loop or chain link to which it is attached during motion of the vehicle over bumps in the road and so on.

To overcome the possible disengagement of the S shaped hook 17, a more complex double S shaped hook 22, FIGS. 4a, 4b and 5 has been developed. The hook 22, FIG. 5, comprises two identical reverse mirror image orientation hooks 24, 26. Hook 24 has a first leg 28 corresponding to and parallel to leg 28' on hook 26 and a second leg 30 connected by an arcuate intermediate portion 32 with corresponding elements on hook 26 with the same reference numerals but primed.

A circular in side elevation view loop 34 is one piece integral with the legs 30 and 30', FIG. 5. In a 90° orientation from the view of FIG. 4a showing the circular loop 34, the loop 34 has a V-shape as shown in FIG. 4b. A different end of the loop 34 is connected to a different one of the legs 30 and 30'. The double S-hook 22 is made of steel rod of generally about ⅜ inches in diameter and thus is significantly smaller in diameter than the single S-hook 17, FIG. 2.

The double S-hook 22 is used in conjunction with a steel plate 36, FIG. 3, attached to a vehicle rear. The plate 36 has a slot 38 typically about 0.50 inches wide and 2 inches long for receiving the ⅜ diameter rod of hook 22 or the safety chain links of a tether. The 0.50 inch width is set at a value to lock the hook 22 which is inserted with a series of convoluted steps similar to those used with the present invention as shown in FIGS. 12 and 12a. Thus, once the hook 22 is inserted into the slot 38 it is difficult for the hook to accidentally disengage from plate 36.

The problem with the plate 36 and slot 38 is that the slot 38 does not accept the single S-hook 17 of FIG. 2 due to its larger diameter rod. The manufacturer of a vehicle needs to install the plate 36 for use with trailers as contemplated by a variety of different customers and owners of the vehicles. Some users of the vehicles may wish to use trailers with the conventional safety chain 20 and S-hook 17. Other users may wish to use trailers with the double S-hook 22. Therefore, a conventional hasp for receiving the hook 17 is not useful with the double S-hook 22 and the plate 36 is not useful with the hook 17. This requires a more costly installation of both the plate 36 and hasp to permit both types of hooks to be used.

The present invention is a recognition of a solution to this problem in providing a single bracket having one opening which is useful with both the single S-hook and double S-hook, the latter arrangement providing an enhanced safety coupling of a safety tether to a trailer.

A vehicle trailer safety tether assembly according to the present invention comprises a sheet metal bracket including means for attaching the bracket to the vehicle, the bracket having at least one T-shaped opening for receiving either one of two different connection link members of a safety tether as set forth below. An elongated safety tether is secured to the trailer and has one of the connection link members for releasable attachment to the bracket in the opening, the one connection link member being selected from any one of the group consisting essentially of a first one piece double S-shaped connection link member formed from a rigid steel rod of a first diameter and a second connection link member comprising a single hook formed of rigid steel rod of a second diameter substantially greater in value than the first diameter, each link member for being selectively releasably engaged with the bracket in the opening, the opening and bracket being arranged for providing relatively enhanced secured coupling for the first connection link member as compared to the second link member.

In one aspect, the first connection link member comprises rigid first and second U-shaped hooks in fixed spaced relation, each hook having first and second legs interconnected by a bend portion, the second leg of each hook having a terminal end; and a rigid central metal loop member for receiving and attachment to the elongated tether, the loop member having first and second ends, the first end being one piece and integral with the first hook first leg and the second end being one piece and integral with the second hook first leg, the hooks being disposed in spaced approximately parallel relation in approximately 180° relative orientation with the terminal ends facing in opposing directions, the first and second hooks and loop member forming interconnected one piece double S-shaped hooks.

In a further aspect, the bracket has a length and width and a central planar portion, a first flange extending at a right angle in a first direction from the plane of the central portion along the length of the central portion distal the opening for attachment to the vehicle and a second flange containing the opening at a bracket edge distal the first flange inclined to the plane of the central portion and extending from the central portion in a second direction opposite to the first direction.

The bracket in a further aspect has two opposing edges, the bracket having two openings in spaced relation adjacent to one of the edges, the bracket at the other of the edges for attachment to the vehicle.

Preferably, the bracket has a central recess in communication with the one edge for receiving a trailer hitch attached to the vehicle, the openings being located on opposing sides of the central recess.

In a further aspect, the first and second hooks lie in parallel planes and are spaced apart a first distance, the bracket having first and second edges defining a length direction, the distance to the edges defining a width direction, a region of the bracket at the first edge for attachment to the vehicle, the opening being adjacent to the second edge and defining a second distance between the second edge and the opening of about the same value as the first distance such that the first leg is received in the opening and the second leg is external the bracket at the second edge, the opening having a first slot portion extending in the length direction and a first width extending in the width direction, the first connection link member comprising circular cylindrical rod having a diameter of about slightly less than the first width, the opening having a second slot portion in communication with the first slot portion, the second slot portion having a first dimension in the length direction less than the first distance and a second dimension in the width direction of about twice the magnitude of the rod diameter, the second link member comprising a rod diameter greater than the value of the first width for reception in the second slot portion.

IN THE DRAWING

FIG. 1 is an isometric view of a trailer hitch and safety chain arrangement of the prior art;

FIG. 2 is a side elevation view of a safety chain end employing a single S-hook for use with the chains of the arrangement of FIG. 1;

FIG. 3 is a top plan view of a steel plate for use with the prior art hook of FIGS. 4a, 4band 5, the hook being attached to a safety chain in place of the hook of FIG. 2;

Figure 6:
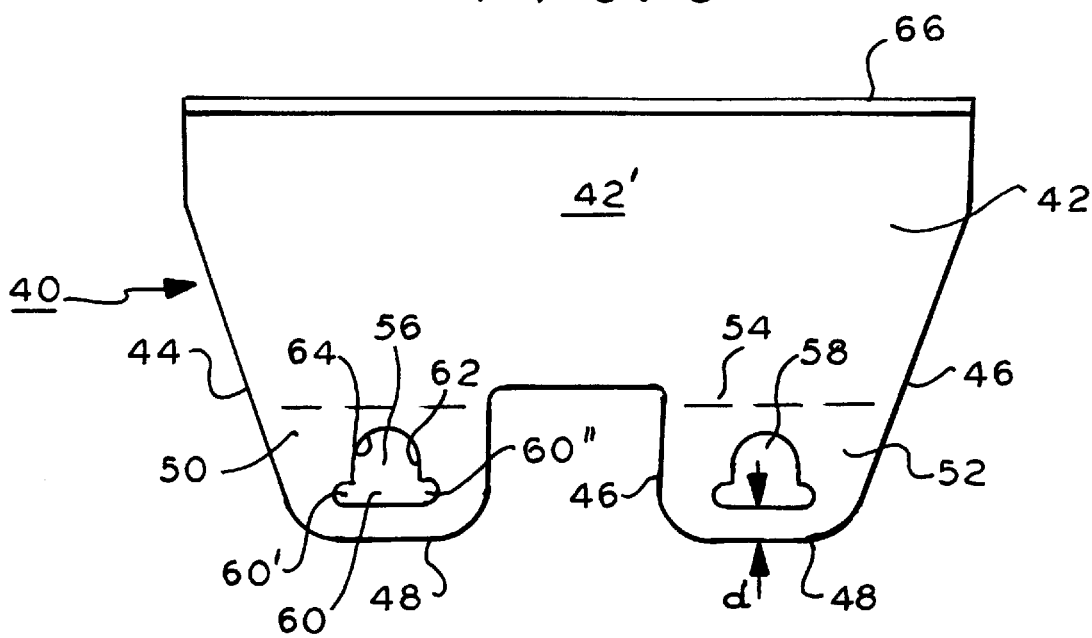
Figure 7:
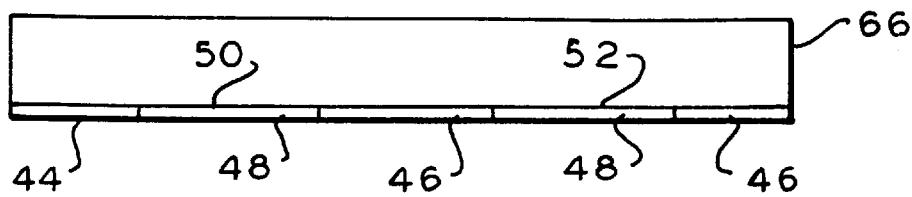

FIGS. 4a, 4ban 5 are respective front and side elevation views and an isometric view of a prior art double S-hook for use with the plate of FIG. 3;

FIG. 6 is a top plan view of a partially formed steel bracket according to an embodiment of the present invention;

FIG. 7 is front elevation view of the bracket of FIG. 6'

Figure 8:
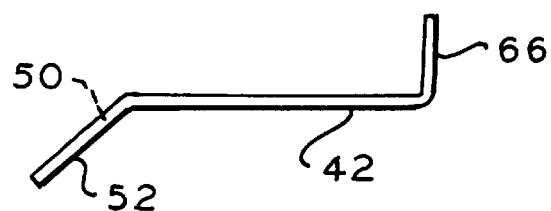
Figure 9:
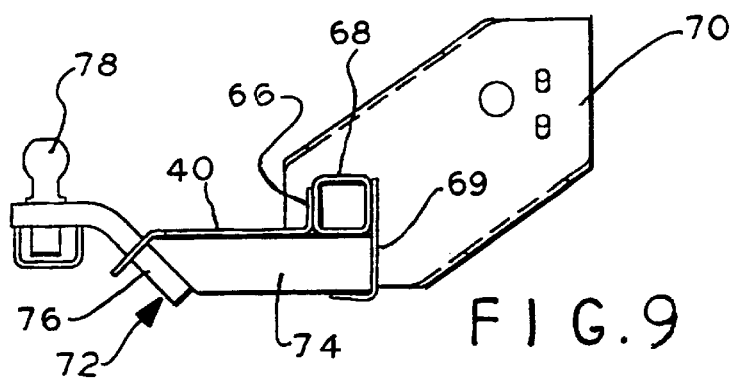
Figure 10:
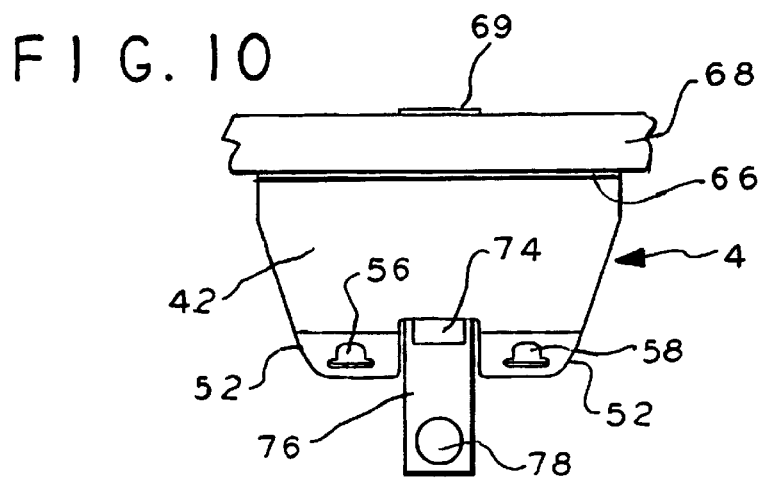
Figure 11:
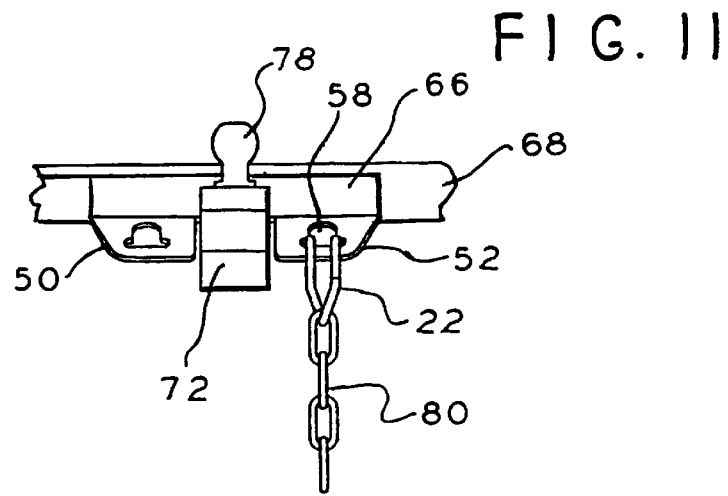
Figure 12:
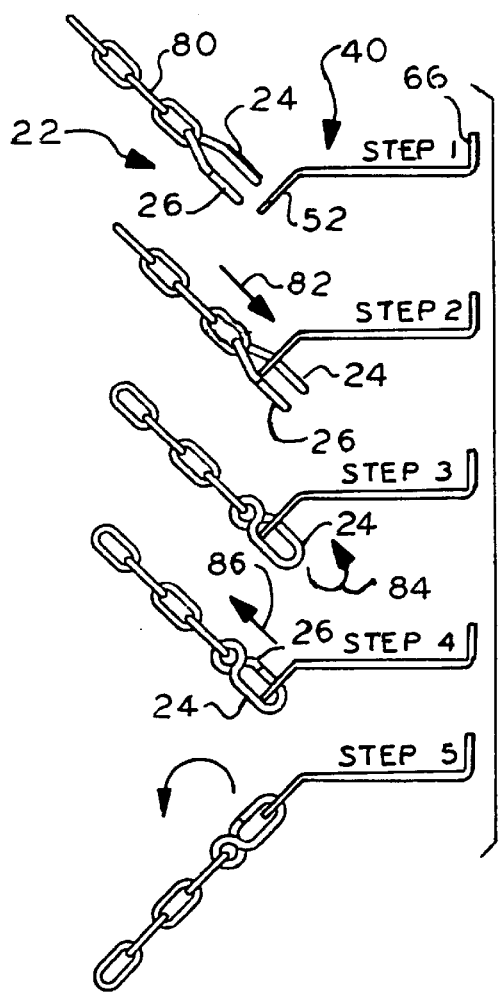
Figure 12A:
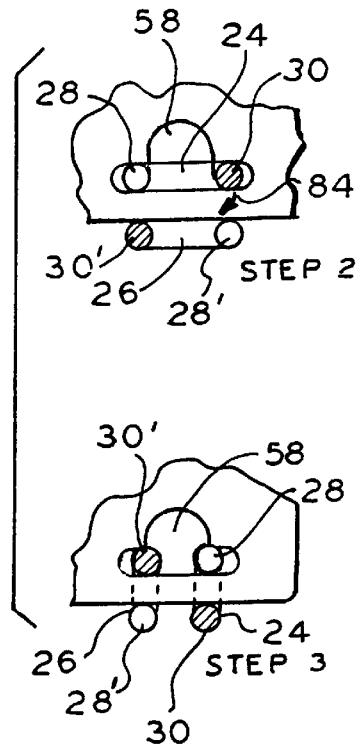
Figure 14:
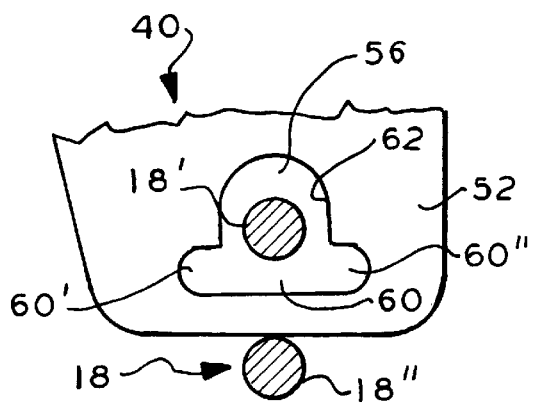
Figure 13:
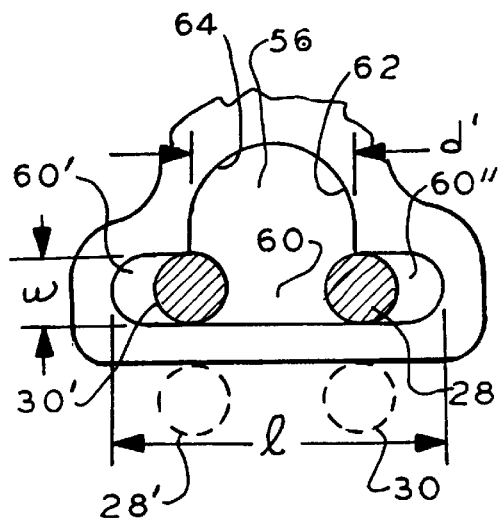

FIG. 8 is a side elevation view of the bracket of FIG. 6 after it is bent at the dashed line to form the completed bracket;

FIG. 9 is a side elevation sectional view of a portion of a vehicle rear end beam structure with the bracket of FIG. 8 attached;

FIG. 10 is a top plan view of the FIG. 9 embodiment;

FIG. 11 is a front elevation view of the embodiment of FIG. 10 further including a safety chain with a connection link member comprising the hook of FIGS. 4a, 4b and 5 releasably attached to the bracket of FIG. 8;

FIG. 12 is a diagrammatic representation of the installation steps of the safety chain of FIG. 11 to the bracket of FIG. 8;

FIG. 13 is a more detailed view of the view at step 3 of FIG. 12a useful for explaining certain principles of the present invention; and FIG. 14 is a view similar to that of FIG. 13 but with a single S-hook of FIG. 2 inserted into the bracket opening.

In FIG. 6, bracket 40 according to the present invention comprises a stamped sheet steel which may be any suitable thickness, e.g.,⅛ to ½ inch thick, for a given anticipated load induced by an attached safety chain. The bracket 40 comprises a plate 42 which may be about 16 inches long from left to right in the figure and about 7 inches wide. The plate 42 tapers at edges 44 and 46. A central notch 46 extends from edges 48. The notch 46 may be about 3 inches deep and 3.5 inches wide. The notch 46 forms two mirror image legs 50, 52 in plate 42. The legs 50, 52 are bent at dashed line 54, preferably at about 45° as shown in FIG. 8 such that the legs 50, 52 are inclined to the plane of the plate 42, forming a central region 42'.

In FIG. 6, a through opening 56 is formed in leg 50 and a preferably identical opening 58 is formed in leg 52. The openings 56 and 58 are generally T-shaped. Representative opening 56, FIG. 13, is formed by a first slot 60 which may be identical to the slot 38 in the plate 36, FIG. 3. Slot 60 is divided into slot portions 60' and 60 " by a second slot 62 in communication with and extending normal to the slot 60. The second slot 62 forms a second slot portion. The second slot 62 has an arcuate edge 64.

The opening 56 (and opening 58) are spaced a distance d, FIG. 6. This distance is important as will be explained. The slot 60, FIG. 13, preferably is about 0.50 inches wide, dimension w, and about 2 inches long, dimension 1, for use with a double S-hook 22, FIG. 5, formed of ⅜ inch diameter steel rod. The slot 62 is preferably about 1 inch long in a direction normal to the length direction of slot 60 and about 1.25 inches wide, distance d', parallel to the slot 60 length direction for use with a single S-hook 17, FIG. 2, of about ⅝ inch diameter steel rod.

The bracket 40, FIGS. 6, 7 and 8 has a flange 66 extending from the plate 42 in a direction opposite to the bend direction of legs 50 and 52. The flange has a width in this embodiment of about 2 inches.

In FIGS. 9 and 10, the bracket 40 is attached to a cross beam 68 which is attached to and between a pair of a gusset plates or beams 70 (one being shown) at a vehicle rear. A conventional trailer hitch 72 comprises a beam 74 attached to the cross beam 68. The bracket 40 plate 42 is attached e.g., welded, to the beam 74. The bracket flange 66 is preferably welded to the cross beam 68. An L-shaped support bracket 69 is preferably welded to the beam 68 and beam 74. The hitch 72 includes a tongue 76 which passes through the notch 46 (FIG. 6) A ball coupler 78 is secured to the tongue 76. The connection link member double S-hook 22 and attached safety chain 80, FIG. 11, is attached to bracket 40 opening 58 by way of example.

To attach the hook 22, FIG. 12, the hooks 24 and 26 are oriented parallel to the slot 60 (FIG. 13). The hook 24 is then inserted into the slot 60, direction 82, step 2. In step 3, the S-hook 22 is then rotated counterclockwise 90° in direction 84 (see also FIG. 12a). In FIG. 12, step 4, the hook 22 is then pulled in direction 86 to seat the hook 22 with the bracket 40. The hook 22 and chain 80 are then rotated as shown, step 5, to the final tow position. A second hook 22 and attached safety chain 80 are attached to the bracket 40 other opening 56 in the same manner. The hook 22 may also be attached to the bracket from beneath the bracket and in this case the step 3 rotation may be clockwise.

In FIG. 13, which manifests the position of the hook 22 in step 4, FIG. 12, the hook 22 legs 28 and 30' are positioned partially in the slot portions 60' and 60" which locks the hooks 24 and 26 to the bracket 40 to provide enhanced safety. It is not easy for the hooks 24 and 26 to randomly disengage from the bracket 40 in the presence of vibrations and shaking as would occur during normal transit over a road. As the hook 22 slides back and forth in the slot 60 at least one of the hooks 24 and 26 is located in a slot portion 60' or 60" to preclude such disengagement. The distance d, FIG. 6, is important in that, as shown in FIG. 13, this is the spacing between the legs 28' and 30' and between the legs 28 and 30. This distance closely matches the spacing between the associate legs to preclude twisting of the hook 22 direction 84 and in the opposite direction should the hook 22 be accidentally placed in the orientation of step 4. In this way, the hook 22 can not twist unless it is axially displaced in a direction opposite direction 82, step 2, FIG. 12, from the seated position of step 4 to the unseated position of step 3. This requires the chain to be rotated accidentally from the position of step 5 to that of step 4 first and then be positioned as shown in step 3 in order for the hook to become disengaged in reverse order of the attachment described above. The probability of this detachment occurring is small. At the same time, the opening while maintaining the integrity of the slot 60 manifesting the function of slot 38, FIG. 3, also permits the attachment of the larger single S-hook 17.

In FIG. 14, the single S-hook 17 having legs 18' and 18" with leg 18' shown engaged with opening 56. Due to the larger diameter of the legs 18' and 18", these legs can not be inserted into the slot 60 portions 60' and 60". The leg 18' thus engages the slot 62 portion of the opening 56. If the slot portions 60' and 60" were made wider to accommodate the hook 17, then the safety feature provided in conjunction with the double S-hook 22 would be considerably reduced. In this way both types of hooks are accommodated by a single bracket 40. This provides substantial cost savings over providing separate hasps and brackets for the two different hooks.

In addition, the openings 56 and 58, FIG. 6 due to the dimensions of the slot 62 also accommodate the chain links of the tether safety chain. This is to permit those users to pass the S-hook 17 and chain 20, FIG. 2 through the openings 56 and 58. The S-hook is then engaged directly with the chain as is presently achieved with prior art large loop hasps as discussed in the introductory portion.

In a further alternative, the openings 56 and 58 slot 62 may be of smaller dimensions to only accommodate and receive the S-hook 17, FIG. 2. The opening in this case is not sufficiently large to receive the chain 20 therethrough. This is not as desirable as the present embodiment.

It will be appreciated by one of ordinary skill that various modifications may be made to the disclosed embodiments without departing from the spirit and scope of the invention as defined in the appended claims. For example, the dimensions given are by way of example and not limitation. Various size hooks and openings and number may be provided in accordance with a given implementation. In the case of change in standards the number of openings provided will correspond to such standards. The shapes of the openings is also given by way of example as they may be rectangular as well as arcuate. Also, the relative size of the openings to the hooks may change somewhat as desired as long as the safety features are maintained as described.

While the tether is shown as a chain, the tether may also comprise steel cable or rope, for example. The hooks and plates while made of steel can also be made of other high strength materials as may be made available. The important aspect is the multiple role of a single opening for cooperating with a number of different dimensioned connection link member hooks. Should hooks of more than two different size rods be used, for example, the opening may be made to accommodate such rods.

What is claimed is:

1. A vehicle trailer safety tether assembly comprising:
    a sheet metal bracket including means for attaching the bracket to the vehicle, the bracket having at least one T-shaped opening for receiving either one of two different connection link members of a safety tether as set forth below; and
    an elongated safety tether secured to the trailer and having one of said connection link members for releasable attachment to said bracket in said opening, said one connection link member being selected from any one of the group consisting essentially of a first one piece double S-shaped connection link member formed from a rigid steel rod of a first diameter; and a second connection link member comprising a single hook formed of rigid steel rod of a second diameter substantially greater in value than the first diameter, each link member for being selectively releasably engaged with the bracket in the opening, the opening and bracket being arranged for providing relatively enhanced secured coupling for the first connection link member as compared to the second link member.

2. The assembly of claim 1 wherein the first connection link member comprises:
    rigid first and second U-shaped hooks in fixed spaced relation, each hook having first and second legs interconnected by a bend portion, the second leg of each hook having a terminal end; and
    a rigid central metal loop member for receiving and attachment to said elongated tether, said loop member having first and second ends, the first end being one piece and integral with the first hook first leg and the second end being one piece and integral with the second hook first leg, the hooks being disposed in spaced approximately parallel relation in approximately 180° relative orientation with the terminal ends facing in opposing directions, said first and second hooks and loop member forming interconnected one piece double S-shaped hooks.

3. The assembly of claim 1 wherein the bracket has a length and width and a central planar portion, a first flange extending at a right angle in a first direction from the plane of the central portion along the length of the central portion distal said opening for attachment to the vehicle and a second flange containing said opening at a bracket edge distal said first flange inclined to the plane of the central portion and extending from the central portion in a second direction opposite to the first direction.

4. The assembly of claim 1 wherein the bracket has two opposing edges, the bracket having two said openings in spaced relation adjacent to one of the edges, the bracket at the other of said edges for attachment to the vehicle.

5. The assembly of claim 4 wherein the bracket has a central recess in communication with the one edge for receiving a trailer hitch attached to the vehicle, said openings being located on opposing sides of said central recess.

6. The assembly of claim 2 wherein the first and second hooks lie in parallel planes and are spaced apart a first distance, the bracket having first and second edges defining a length direction, the distance to the edges defining a width direction, a region of the bracket at the first edge for attachment to the vehicle, the opening being adjacent to the second edge and defining a second distance between the second edge and the opening of about the same value as the first distance such that the first leg is received in the opening and the second leg is external the bracket at the second edge, the opening having a first slot portion extending in the length direction and a first width extending in the width direction, the first connection link member comprising circular cylindrical rod having a diameter of about slightly less than the first width, the opening having a second slot portion in communication with the first slot portion, the second slot portion having a first dimension in the length direction less than said first distance and a second dimension in the width direction of about twice the magnitude of the rod diameter, the second link member comprising a rod diameter greater than the value of said first width for reception in said second slot portion.

7. The assembly of claim 6 wherein the second slot portion distal the first slot portion is rounded.

8. The assembly of claim 5 wherein the bracket with said openings comprises a first flange inclined relative to a central region of the bracket.

9. The assembly of claim 8 wherein the bracket includes a further flange at right angles to the central region and located distal said first flange for attachment to the vehicle.

10. The assembly of claim 1 wherein the first connection link member comprises ⅜ inch diameter steel rod and the second connection link member comprises ⅝ inch diameter steel rod, said opening being dimensioned such that either of said link members are receivable in said opening for providing the relative enhanced safety securing of the first link member to the bracket.

11. A vehicle trailer universal safety tether assembly comprising:
    a sheet metal bracket for attachment to the vehicle, the bracket having at least one T-shaped opening for receiving either one of two different connection links of a safety tether as set forth below; and
    an elongated safety tether secured to the trailer and having a connection link member for releasable attachment to said bracket in said opening, said link member being selected from any one of the group consisting essentially of:
    a first connection link member formed from a rigid steel rod of a first diameter comprising:
        rigid first and second U-shaped hooks in fixed spaced relation, each hook having first and second legs interconnected by a bend portion, the second leg of each hook having a terminal end;
        a rigid central metal loop member for receiving and attachment to said elongated tether, said loop member having first and second ends, the first end being one piece and integral with the first hook first leg and the second end being one piece and integral with the second hook first leg, the hooks being disposed in spaced approximately parallel relation in approximately 180° relative orientation with the terminal ends facing in opposing directions, said hooks and loop member forming interconnected one piece double S-shaped hooks;
        said hooks for being releasable engaged with the bracket in said opening; and
    a second connection link member comprising a single hook formed of steel rod of a second diameter substantially greater in value than the first diameter for being releasable engaged with the bracket in the opening.

* * * * *